United States Patent
Viani et al.

(10) Patent No.: US 10,416,190 B2
(45) Date of Patent: Sep. 17, 2019

(54) MODULAR ATOMIC FORCE MICROSCOPE WITH ENVIRONMENTAL CONTROLS

(71) Applicant: Oxford Instruments Asylum Research, Inc., Goleta, CA (US)

(72) Inventors: Mario Viani, Santa Barbara, CA (US); Roger Proksch, Santa Barbara, CA (US); Maarten Rutgers, Los Angeles, CA (US); Jason Cleveland, Ventura, CA (US); Jim Hodgson, Santa Barbara, CA (US)

(73) Assignee: Oxford Instruments Asylum Research Inc, Goleta, CA (US)

( * ) Notice: Subject to any disclaimer, the term of this patent is extended or adjusted under 35 U.S.C. 154(b) by 0 days.

(21) Appl. No.: 15/445,779

(22) Filed: Feb. 28, 2017

(65) Prior Publication Data
US 2017/0168089 A1   Jun. 15, 2017

Related U.S. Application Data

(63) Continuation of application No. 14/817,517, filed on Aug. 4, 2015, now Pat. No. 9,581,616, which is a continuation of application No. 13/998,691, filed on Nov. 25, 2013, now Pat. No. 9,097,737.

(51) Int. Cl.
| | |
|---|---|
| *G01Q 10/00* | (2010.01) |
| *G01Q 30/10* | (2010.01) |
| *G01Q 30/12* | (2010.01) |
| *G01Q 30/20* | (2010.01) |
| *G01Q 30/18* | (2010.01) |

(52) U.S. Cl.
CPC ........... *G01Q 30/10* (2013.01); *G01Q 10/00* (2013.01); *G01Q 30/18* (2013.01); *G01Q 30/20* (2013.01); *G01Q 30/12* (2013.01)

(58) Field of Classification Search
None
See application file for complete search history.

(56) References Cited

U.S. PATENT DOCUMENTS

| | | | |
|---|---|---|---|
| 359,206 | A | 3/1887 | Dunn |
| 4,109,520 | A | 8/1978 | Eriksson |
| 4,186,305 | A | 1/1980 | Taoka et al. |
| 4,301,252 | A | 11/1981 | Baker et al. |
| 4,596,928 | A | 6/1986 | Dantilatos |
| 4,892,830 | A | 1/1990 | Findley et al. |
| 4,893,912 | A | 1/1990 | Kohnen et al. |
| 5,043,578 | A | 8/1991 | Guthner et al. |
| 5,254,854 | A | 10/1993 | Betzig |
| 5,260,824 | A | 11/1993 | Okada et al. |
| 5,266,801 | A | 11/1993 | Elings et al. |
| RE34,489 | E | 12/1993 | Hansma et al. |
| 5,289,004 | A * | 2/1994 | Okada ............... G01Q 10/065 250/423 F |
| 5,291,775 | A * | 3/1994 | Gamble ............... B82Y 35/00 250/307 |

(Continued)

*Primary Examiner* — Andrew Smyth
(74) *Attorney, Agent, or Firm* — Law Office of Scott C Harris, Inc

(57) ABSTRACT

A modular Atomic Force Microscope that allows ultra-high resolution imaging and measurements in a wide variety of environmental conditions is described. The instrument permits such imaging and measurements in environments ranging from ambient to liquid or gas or extremely high or extremely low temperatures.

15 Claims, 15 Drawing Sheets

(56) References Cited

U.S. PATENT DOCUMENTS

| | | | |
|---|---|---|---|
| 5,308,974 A | 5/1994 | Elings et al. | |
| 5,353,115 A | 10/1994 | Mcintyre | |
| 5,362,964 A | 11/1994 | Knowles et al. | |
| 5,371,365 A * | 12/1994 | Watanabe | B82Y 35/00 250/443.1 |
| 5,388,452 A * | 2/1995 | Harp | B82Y 35/00 250/307 |
| 5,393,980 A | 2/1995 | Yost et al. | |
| 5,412,211 A | 5/1995 | Knowles | |
| 5,412,980 A | 5/1995 | Eiings et al. | |
| 5,440,920 A | 8/1995 | Jung et al. | |
| 5,441,343 A | 8/1995 | Fyikki et al. | |
| 5,463,897 A | 11/1995 | Prater et al. | |
| 5,519,212 A | 5/1996 | Eiings et al. | |
| 5,560,244 A | 10/1996 | Prater et al. | |
| 5,587,523 A | 12/1996 | Jung et al. | |
| 5,621,210 A * | 4/1997 | Lindsay | G01Q 20/02 250/307 |
| 5,625,152 A | 4/1997 | Pandorf et al. | |
| 5,635,136 A | 6/1997 | Glaunsinger et al. | |
| 5,652,428 A | 7/1997 | Nishioka et al. | |
| 5,654,546 A * | 8/1997 | Lindsay | B82Y 35/00 250/441.11 |
| 5,675,154 A * | 10/1997 | Lindsay | B82Y 10/00 250/440.11 |
| 5,696,313 A | 12/1997 | Hafele | |
| 5,714,682 A | 2/1998 | Prater et al. | |
| 5,731,587 A | 3/1998 | DiBattista et al. | |
| 5,744,704 A | 4/1998 | Hu et al. | |
| 5,750,989 A * | 5/1998 | Lindsay | B82Y 35/00 250/442.11 |
| 5,760,396 A | 6/1998 | Lindsay et al. | |
| 5,763,767 A | 6/1998 | Jung et al. | |
| 5,804,709 A | 9/1998 | Bourgoin et al. | |
| 5,821,545 A | 10/1998 | Lindsay et al. | |
| 5,825,020 A * | 10/1998 | Hansma | B82Y 35/00 250/216 |
| 5,831,153 A * | 11/1998 | Binnig | B82Y 35/00 73/105 |
| 5,834,644 A * | 11/1998 | Shao | B82Y 35/00 73/105 |
| 5,857,341 A | 1/1999 | Amakusa | |
| 5,861,550 A * | 1/1999 | Ray | B82Y 35/00 73/105 |
| 5,874,669 A | 2/1999 | Ray | |
| 5,929,438 A * | 7/1999 | Suzuki | B82Y 35/00 136/228 |
| 6,021,665 A | 2/2000 | Hayashi et al. | |
| 6,032,518 A | 3/2000 | Prater et al. | |
| 6,051,825 A * | 4/2000 | Lindsay | G01Q 30/14 250/201.3 |
| 6,095,679 A | 8/2000 | Hammiche et al. | |
| 6,180,415 B1 | 1/2001 | Schutz et al. | |
| 6,185,992 B1 | 2/2001 | Daniels et al. | |
| 6,193,199 B1 * | 2/2001 | Karam, II | B82Y 35/00 248/276.1 |
| 6,194,813 B1 | 2/2001 | Israelachvili | |
| 6,200,022 B1 | 3/2001 | Hammicne et al. | |
| 6,242,291 B1 | 6/2001 | Kusurnoto et al. | |
| 6,389,886 B2 | 5/2002 | Daniels et al. | |
| 6,437,328 B1 * | 8/2002 | Knauss | B82Y 35/00 250/307 |
| 6,612,160 B2 | 9/2003 | Massie et al. | |
| 7,038,443 B2 | 5/2006 | Proksch et al. | |
| 7,253,408 B2 * | 8/2007 | West | G01Q 70/02 250/227.26 |
| 8,269,485 B2 | 9/2012 | Bocek et al. | |
| 8,370,906 B2 | 2/2013 | Wen et al. | |
| 8,502,525 B2 | 8/2013 | Proksch et al. | |
| 9,097,737 B2 | 8/2015 | Viani et al. | |
| 2001/0008272 A1 | 7/2001 | Rinn | |
| 2002/0001544 A1 | 1/2002 | Hess | |
| 2004/0083799 A1 * | 5/2004 | Markakis | B82Y 35/00 73/105 |
| 2005/0034512 A1 * | 2/2005 | Su | B82Y 35/00 73/104 |
| 2006/0043289 A1 * | 3/2006 | West | G01Q 30/14 250/309 |
| 2007/0248892 A1 * | 10/2007 | Rangelow | G01Q 60/16 430/5 |
| 2010/0089869 A1 * | 4/2010 | Bussan | G01Q 20/04 216/59 |
| 2011/0239336 A1 * | 9/2011 | Ruiter | B82Y 35/00 850/1 |
| 2013/0036521 A1 * | 2/2013 | Prater | B82Y 35/00 850/56 |
| 2013/0047303 A1 * | 2/2013 | King | B82Y 35/00 850/56 |

* cited by examiner

MODULAR ATOMIC FORCE MICROSCOPE WITH ENVIRONMENTAL CONTROLS

CROSS-REFERENCE OF RELATED APPLICATION

This application is a continuation application of U.S. Ser. No. 14/817,517, filed Aug. 4, 2015, which was a continuation of Ser. No. 13/998,691 filed Nov. 25, 2013, now U.S. Pat. No. 9,097,737 issued Aug. 4, 2015 and entitled "Modular Atomic Force Microscope with Environmental Controls", the disclosures of these parent applications are hereby incorporated by reference, in their entirety.

BACKGROUND OF THE INVENTION

Scanning probe devices such as the scanning Probe microscope ("SPM") or atomic force microscope ("AFM") can be used to obtain an image or other information indicative of the features of a wide range of materials with molecular and even atomic level resolution. In addition, AFMs and SPMs are capable of measuring forces accurately at the piconewton to micronewton range, in a measurement mode known as a force-distance curve or force curve. As the demand for resolution has increased, requiring the measurement of decreasingly smaller forces free of noise artifacts, the old generations of these devices are made obsolete. A demand for faster results, requiring decreasingly smaller cantilevers, only reinforces this obsolescence. The preferable approach is a new device that addresses the central issue of measuring small forces with minimal noise, while providing an array of modules optimizing the performance of the device when using small cantilevers or when doing specialized applications such as optical techniques for biology, nanoindentation and electrochemistry.

For the sake of convenience, the current description focuses on systems and techniques that may be realized in particular embodiments of scanning probe devices, the SPM or the AFM. Scanning probe devices also include such instruments as 3D molecular force probe instruments, scanning tunneling microscopes ("STMs"), high-resolution profilometers (including mechanical stylus profilometers), surface modification instruments, nanoindenters, chemical/biological sensing probes, instruments for electrical measurements and micro-actuated devices. The systems and techniques described herein may be realized in such other scanning probe devices.

A SPM or AFM is a device which obtains topographical information (and/or other sample characteristics) while scanning (e.g., rastering) a sharp tip on the end of a probe relative to the surface of the sample. The information and characteristics are obtained by detecting changes in the deflection or oscillation of the probe (e.g., by detecting small changes in amplitude, deflection, phase, frequency, etc., and using feedback to return the system to a reference state). By scanning the tip relative to the sample, a map of the sample topography or other characteristics may be obtained.

Changes in the deflection or oscillation of the probe are typically detected by an optical lever arrangement whereby a light beam is directed onto the side of the probe opposite the tip. The beam reflected from the probe illuminates a position sensitive detector ("PSD"). As the deflection or oscillation of the probe changes, the position of the reflected spot on the PSD also changes, causing a change in the output from the PSD. Changes in the deflection or oscillation of the probe are typically made to trigger a change in the vertical position of the base of the probe relative to the sample (referred to herein as a change in the Z position, where Z is generally orthogonal to the X/Y plane defined by the sample), in order to maintain the deflection or oscillation at a constant pre-set value. It is this feedback that is typically used to generate a SPM or AFM image.

SPMs or AFMs can be operated in a number of different sample characterization modes, including contact modes where the tip of the probe is in constant contact with the sample surface, and AC modes where the tip makes no contact or only intermittent contact with the surface.

Actuators are commonly used in SPMs and AFMs, for example to raster the probe or to change the position of the base of the probe relative to the sample surface. The purpose of actuators is to provide relative movement between different parts of the SPM or AFM; for example, between the tip of the probe and the sample. For different purposes and different results, it may be useful to actuate the sample or the tip or some combination of both. Sensors are also commonly used in SPMs and AFMs. They are used to detect movement, position, or other attributes of various components of the SPM or AFM, including movement created by actuators.

For the purposes of this specification, unless otherwise indicated, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators, and the term "sensor" or "position sensor" refers to a device that converts a physical quantity such as displacement, velocity or acceleration into one or more signals such as an electrical signal, including optical deflection detectors (including those referred to above as a PSD and those described in U.S. Pat. No. 6,612,160, Apparatus and Method for Isolating and Measuring Movement in Metrology Apparatus), capacitive sensors, inductive sensors (including eddy current sensors), differential transformers (such as those described in U.S. Pat. No. 7,038,443 and continuations thereof, Linear Variable Differential Transformers for High Precision Position Measurements, U.S. Pat. No. 8,269,485 and continuations thereof, Linear Variable Differential Transformer with Digital Electronics, and U.S. Pat. No. 8,502,525, and continuations thereof, Integrated Micro-Actuator and Linear Variable Differential Transformers for High Precision Position Measurements, which are hereby incorporated by reference in their entirety), variable reluctance, optical interferometry, strain gages, piezo sensors, magnetostrictive and electrostrictive sensors.

Some current SPM/AFMs can take images up to 100 um$^2$, but are typically used in the 1-10 um$^2$ regime. Such images typically require from four to ten minutes to acquire. Efforts are currently being made to move toward what is sometimes called "video rate" imaging. Typically those who use this term include producing images at the rate of one per second all the way to true video rate at the rate of 30 per second. Video rate imaging would enable imaging moving samples, imaging more ephemeral events and simply completing imaging on a more timely basis. One important means for moving toward video rate imaging is to decrease the mass of the probe, thereby achieving a higher resonant frequency and as well a lower spring constant.

Conventional SPM/AFM probes are currently 50-450 μm in length with spring constants of 0.01-200 N/m and fundamental resonant frequencies ($f_R$) of 10-500 kHz. Physical laws put lower limits on the achievable resolution and scan speed of conventional probes, given acceptable noise levels.

To get the best resolution measurements, one wants the tip of the probe to exert only a low force on the sample. In biology, for example, one often deals with samples that are so soft that forces above 10 pN can modify or damage the sample. This also holds true for high resolution measurements on hard samples such as inorganic crystals, since higher forces have the effect of pushing the tip into the sample, increasing the interaction area and thus lowering the resolution. For a given deflection of the probe, the force increases with the spring constant (k) of the probe. When operating in air in AC modes where the tip makes only intermittent contact with the sample surface, spring constants below 30 N/m are desirable. For general operation in fluid, very small spring constants (less then about 1.0 N/m) are desirable.

To get measurements with higher scan speeds, one wants probes with a high $f_R$. After passing over a sample feature, the probe response is about $1/f_R$ seconds for contact modes and $Q/f_R$ seconds for AC modes (where Q is the quality factor for the probe). This sets a fundamental limit on scanning speed: raising the response time of the probe requires a probe with a high $f_R$ or, in the case of AC modes, a low Q.

A higher $f_R$ also means lower noise operation. The thermal noise of a probe involves fixed noise energy of order kT (where k is the Boltzmann constant and T is the temperature in Kelvin) spread over a frequency range up to approximately the $f_R$. Thus, the higher $f_R$, the lower the noise per unit band width below $f_R$.

Probes with a high resonant frequency and a low spring constant can be achieved by making them smaller and thinner. However, using current SPMs/AFMs with probes significantly smaller than conventional ones presents difficulties. In general, optimal optical lever detection requires that the spot from the light beam directed onto the side of the probe opposite the tip should substantially fill the area available in one dimension. Underfilling results in a loss of optical lever detection efficiency because the reflected beam diverges more than necessary. Overfilling the lever means losing light and producing unwanted interference fringes due to light reflected off the sample.

One ideal probe for video rate imaging would have a $f_R$ in the 5-10 MHz range and a force constant in the 1-40 N/m range. This implies shrinking conventional probes by an order of magnitude, to approximately 5-8 μm in length or width. Such a shrinking, taken together with the requirement that the spot substantially fill the probe, means that the spot on the probe also must be shrunk. The optical system producing the beam incident on the probe should have a numerical aperture (NA) sufficient with the wavelength of the light from the light source to form a focused spot approximately 5-8 μm in diameter in at least one direction.

The relatively large numerical aperture required to so shrink the spot results in a shallow depth of focus. This can present problems with the refocusing necessary when replacing one probe with another or when using a probe with more than one cantilever. In addition, the large opening angle of the incident beam used to achieve a high numerical aperture can require complex lens systems or an accumulation of lenses in close proximity to the probe.

A SPM/AFM that takes advantage of these smaller, high $f_R$, high bandwidth probes is described in U.S. Pat. No. 8,370,906, Modular Atomic Force Microscope. The Cypher AFM manufactured by the assignee of that patent, as well as any patent resulting from the current application, provides a portion of the results forthcoming from these cantilevers without their actual employment. With this instrument lower noise measurements and increased imaging rates are possible without the use of smaller, high $f_R$, high bandwidth cantilevers. The Cypher AFM routinely images point lattice defects in crystal surfaces in liquid environments.

In many applications the old generations of SPM/AFMs required the probe and sample to be relatively isolated in a local, user-controlled environment. Where the user was seeking an understanding of sample properties in a particular environment, for example in a particular liquid or particular gas, the sample and the probe used to sense the sample both had to be isolated and maintained at the environment of interest. The same was true where the user was seeking an understanding of sample properties at a particular temperature. In either case the environment so created also had to facilitate a compliant connection between the sample and the probe so that when the sample moved relative to the probe, or vice versa, the motion was minimally distorted and the image and measurements also minimally distorted.

The requirement that an understanding of sample properties in a particular environment or at a particular temperature means that the sample and the probe both have to be isolated and maintained at the environment or temperature of interest is of even greater importance when the when the user is employing smaller, high $f_R$, high bandwidth probes or is using a SPM/AFM like that described in U.S. Pat. No. 8,370,906, Modular Atomic Force Microscope, (which includes the Cypher AFM manufactured by the assignee of that patent). In order to fully achieve the resolution and imaging rates made possible by these probes and SPM/AFMs when a particular environment or particular temperature is important, isolation is even more critical than with old generations of SPM/AFMs.

FIG. 1 shows a cross section of a prior art apparatus for sealing the probe and sample. In this design an o-ring 4020 or other flexible seal seals the volume around the probe 1040 and between the cantilever holder 4010 and the sample 1030 mounted on the scanner 4000. The compliant nature of the o-ring 4020 produces relatively undistorted motion between a moving sample scanner and static cantilever holder; or between a static sample scanner and a moving cantilever holder.

However several performance issues arise with the apparatus shown in FIG. 1 The most significant is the relatively small diameter of typical sealing elastomeric o-rings (~1 mm) severely constrains our ability to design an apparatus that eliminates distortion in the scanning motion. These o-rings simply are not compliant enough. The FIG. 1 design is notorious for distorting the scanning motion of relatively weak open loop tube scanners. However, even with stiffer scanners employing piezoelectric stacks and closed loop sensors, the FIG. 1 design will cause scanning motion distortion as the load dependent elasticity of the o-ring deflects the mechanical structure between the sample and X/Y sensors (not shown) housed in the sample scanner 4000. This is especially obvious when the user is acquiring a series of relatively small images (scan of <100 nm) separated by relatively large (>5 um) offsets. As the o-ring relaxes after an offset, the relaxing force exerted by the o-ring 4020 on the mechanical structure between the sample and the sample scanner 4000 causes creep in the subsequently acquired image, the more so the less time is allowed between scans.

Given the interest in observing dynamic phenomena, the cell design should incorporate ports that allow for liquid and/or gas perfusion thereby allowing the cell environment to be changed during imaging or other measurements. The port positioning is important for ensuring complete exchange of fluid during perfusion experiments. Additionally, the cell should be able to maintain moderate pressures (~5 psig) thereby allowing gravity flow perfusion. Gravity forced perfusion is a simple, yet noise free method for flowing liquids during AFM measurements.

Temperature dependent effects in materials are of extreme importance. As devices begin to shrink further into the sub-100 nm range following the trend predicted by Moore's law, the topic of thermal properties and transport in such nanoscale devices becomes increasingly important. In addition, basic material science requires in depth understanding of the nanoscale thermodynamics of materials. Polymer crystallization for example, determines in great extent the macroscopic mechanical properties of the material but is mediated by nanoscale effects.

Temperature control on nanoscale devices while they are being measured is also of great importance. Temperature differences between the measurement point and the thermometry can cause significant errors in the quantification of, for example, various thermodynamic transitions including the melting and glass transitions in polymers.

FIG. 2 shows a cross section of a prior art heater for maintaining the probe and sample at or near a particular temperature. These heaters used a sample block 1000 made of a material with a high thermal conductivity, such as copper. A heating element 1010 was included within or attached to the block 1000 as was a temperature measuring means 1020. The temperature measuring means 1020 was of course used to measure the temperature of the sample block 1000 and might also be used in a control circuit (not shown). The sample 1030 was mounted to the top surface of the sample block 1000 and the sample block was in turn mounted on a scanner (not shown). The probe 1040 was positioned above the sample.

One important challenge posed by the FIG. 2 heater is that the temperature measuring means 1020 is extremely difficult to place next to the region of the sample 1045 that is being imaged or measured by the tip of the probe 1040. Temperature gradients tend to make the temperature of this region 1045 different from the temperature measured by the temperature measuring means 1020.

A second challenge is minimizing image drift. To this end, materials with low thermal expansion must be used in the mechanical structure between the sample and X/Y sensors (not shown) housed in the sample scanner (not shown) on which the sample block 1000 is mounted.

A third challenge is managing the extraction of excess heat. In heating applications it is critical to maximize the thermal resistance between the sample heater and the elements of the mechanical structure between the sample and X/Y sensors (not shown) which may expand/contract with temperature changes and lead to degraded imaging performance. At an extreme, if the temperature of the Z-axis actuator rises above its Curie temperature, it will lose its actuation ability and the microscope will be rendered inoperable. This same problem affects other SPM/AFMs covered by prior art and has been solved by inserting a liquid cooled metal block between the piezoelectric actuator and the heat source. Sufficiently thin and flexible rubber hoses connect this block to a mechanical pump which circulates cooling water. Sufficiently pliable hoses will minimize scan distortion but often the mechanical vibrations of the pump and the pulsation of the fluid flow will introduce undesirable noise and deteriorate instrument performance. Fluid leaks which damage the instrument are also not uncommon.

A similar problem arises in cooling applications where thermoelectric devices are an attractive and compact method for cooling the sample. With these devices the minimum temperature reachable on the cold side of the device depends heavily on the efficiency of heat extraction from the hot side. Active methods of extracting heat from the hot side of the device include using pumped coolant. Although pumped coolant is an efficient method for heat extractions it complicates the design with the addition of pumps and fluid routing in a very constrained space. Additionally, pumps can add an unacceptable amount of acoustic and vibration noise to the SPM/AFM measurements.

SUMMARY OF THE INVENTION

DESCRIPTION OF THE PREFERRED EMBODIMENTS

Figure 3:
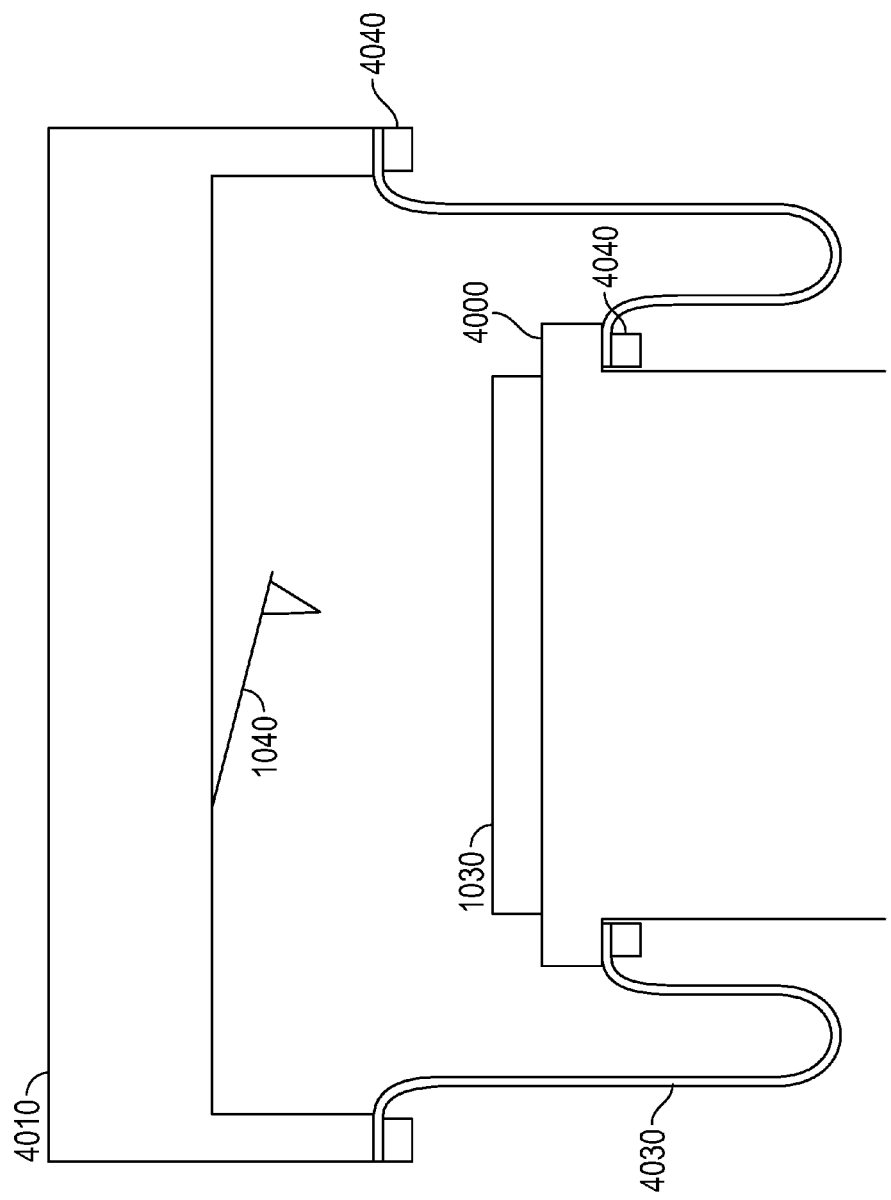
FIG. 3: Block diagram showing a sealed cell using a rolling diaphragm.

FIG. 3 shows a cross section of the apparatus for isolating the probe and sample of the present invention. In this design the probe 1040 and sample 1030 are sealed in a chamber defined by the cantilever holder 4010, a rolling diaphragm fabricated from hot/cold and chemically resistant elastomers among other possibilities 4030 and the scanner 4000. The rolling diaphragm 4030 of the present invention provides a maximum of about one centimeter of clearance, an order of magnitude greater than the one millimeter of clearance provided by the typical o-ring used in the prior art sealing apparatus of FIG. 1. Accordingly the stiffness of the rolling diaphragm is much smaller and the scanner 4000 and cantilever holder 4010 move freely relative to each other during imaging and measurements. The smaller stiffness means that the forces on the mechanical structure between the sample 1030 and X/Y sensors (not shown) housed in the scanner 4000 are greatly reduced and hence scan distortion also.

Rolling diaphragms can be made of a variety of hot/cold and chemically resistant elastomers such as fluoroelastomers (for example Viton) or perfluoroelastomers (for example Kalrez). It is also possible i) to manufacture composite rolling diaphragms with a thin Teflon sheet bonded to a less chemically inert rubber sheet, or ii) to form fabric reinforced rolling diaphragms, where the fabric layer reinforces the chemically inert elastomer layer so that the diaphragm can withstand higher pressures.

In addition to creating a robust seal for isolating the probe and sample without compromising scan performance, a rolling diaphragm can relatively easily accommodate a range of sample thicknesses. Rolling diaphragms have primarily been used to create seals in pistons because they can seal over a large range of positions. For example, a rolling diaphragm with an outer diameter of 23 mm, an inner diameter of 18 mm, and a height of 15 mm has a full stroke length of 10 mm, meaning that it can accommodate sample thicknesses up to 10 mm.

Figure 1:
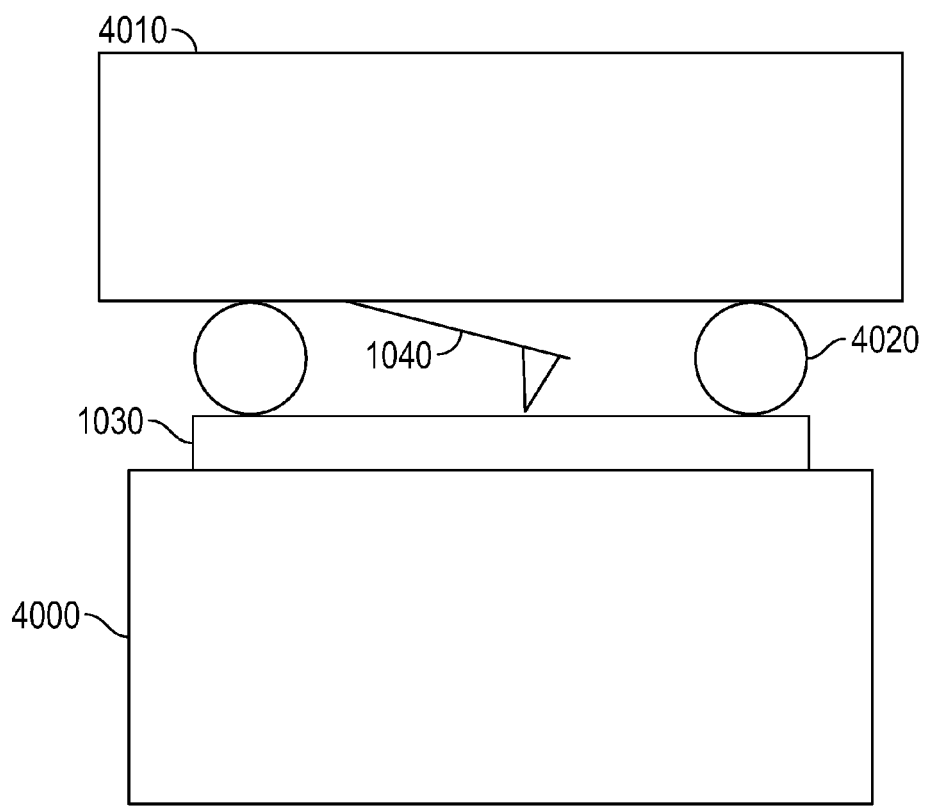
FIG. 1: Cross sectional view showing sealed cells in prior art.

It should also be noted that the use of a rolling diaphragm keeps scan performance independent of the magnitude of the clamping force required to create the seal. In FIG. 3, the clamps 4040 used to seal the rolling diaphragm membrane against the scanner 4000 and cantilever holder 4010 can be tightened as much as is necessary. However, for the design depicted in FIG. 1, the more the o-ring 4020 is compressed between the sample 1030 (or scanner 4000) and cantilever holder 4010 the more the scan performance is compromised because of the larger forces on the mechanical structure between the sample 1030 and X/Y sensors (not shown) housed in the scanner 4000. Therefore minimizing o-ring 4020 compression in FIG. 1 is advantageous for scan performance but this performance could lead to possible leaks if the required compression is not achieved.

Figure 4:
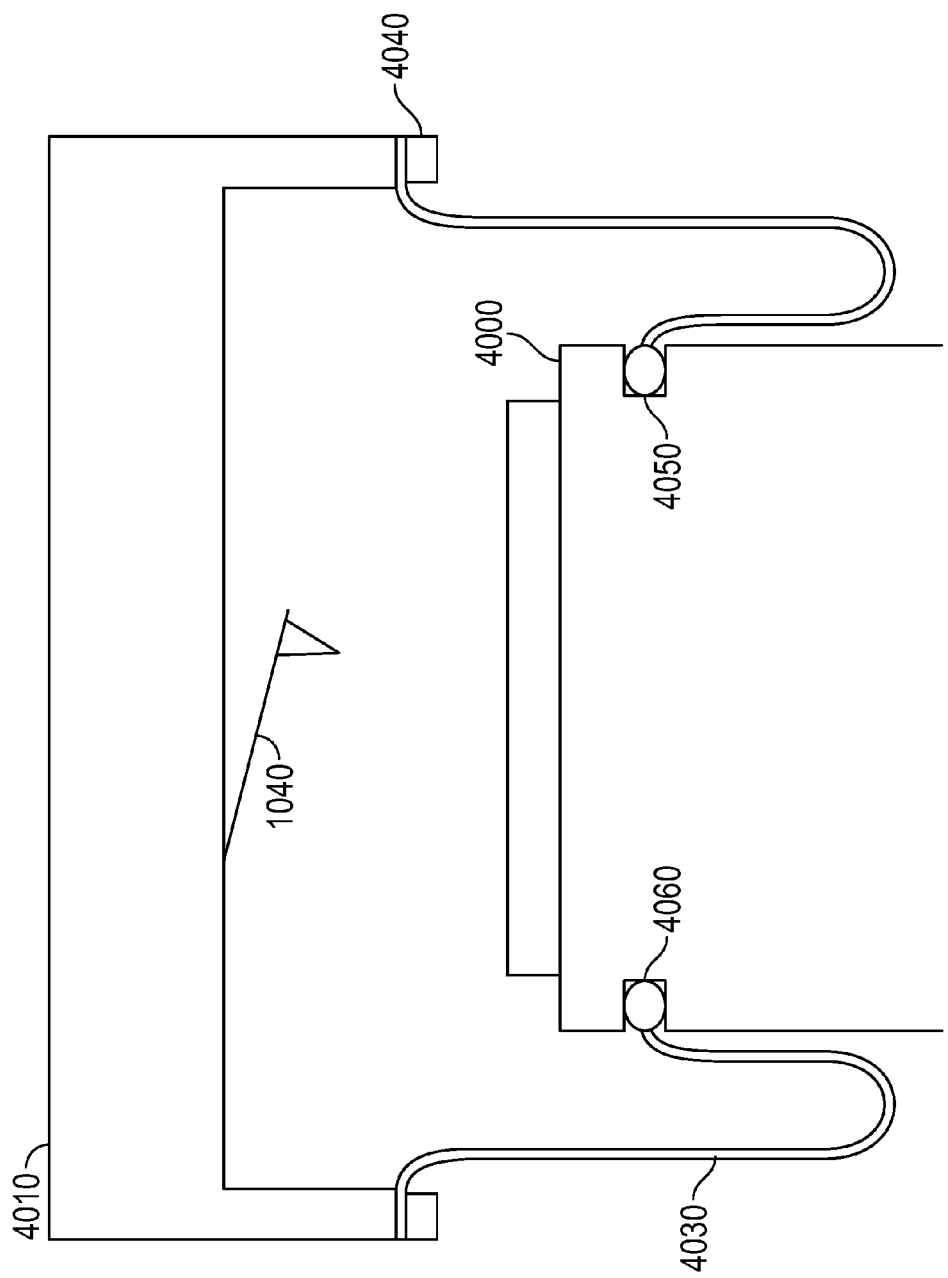
FIG. 4: Block diagram showing a sealed cell using a rolling diaphragm with an integrated o-ring.

FIG. 4 shows an alternate design of a sealed cell for isolating the probe and sample using the rolling diaphragm. The scanner 4000 of this design has a groove 4060 which will accommodate an oversized bead or o-ring 4050 that is molded into one edge of the rolling diaphragm 4030. During assembly of the sealed cell, the inner diameter of the rolling diaphragm 4030 is stretched around the scanner 4000 until it pulls itself into the groove 4060. The cross section of the bead or o-ring 4050 of the rolling diaphragm 4030 has an appropriately oversized cross section (10-40%) to make a tight seal. This design of the sealed cell has the advantage that the rolling diaphragm 4030 is much more easily attached and removed from the scanner 4000 for exchange or cleaning.

Figure 5:
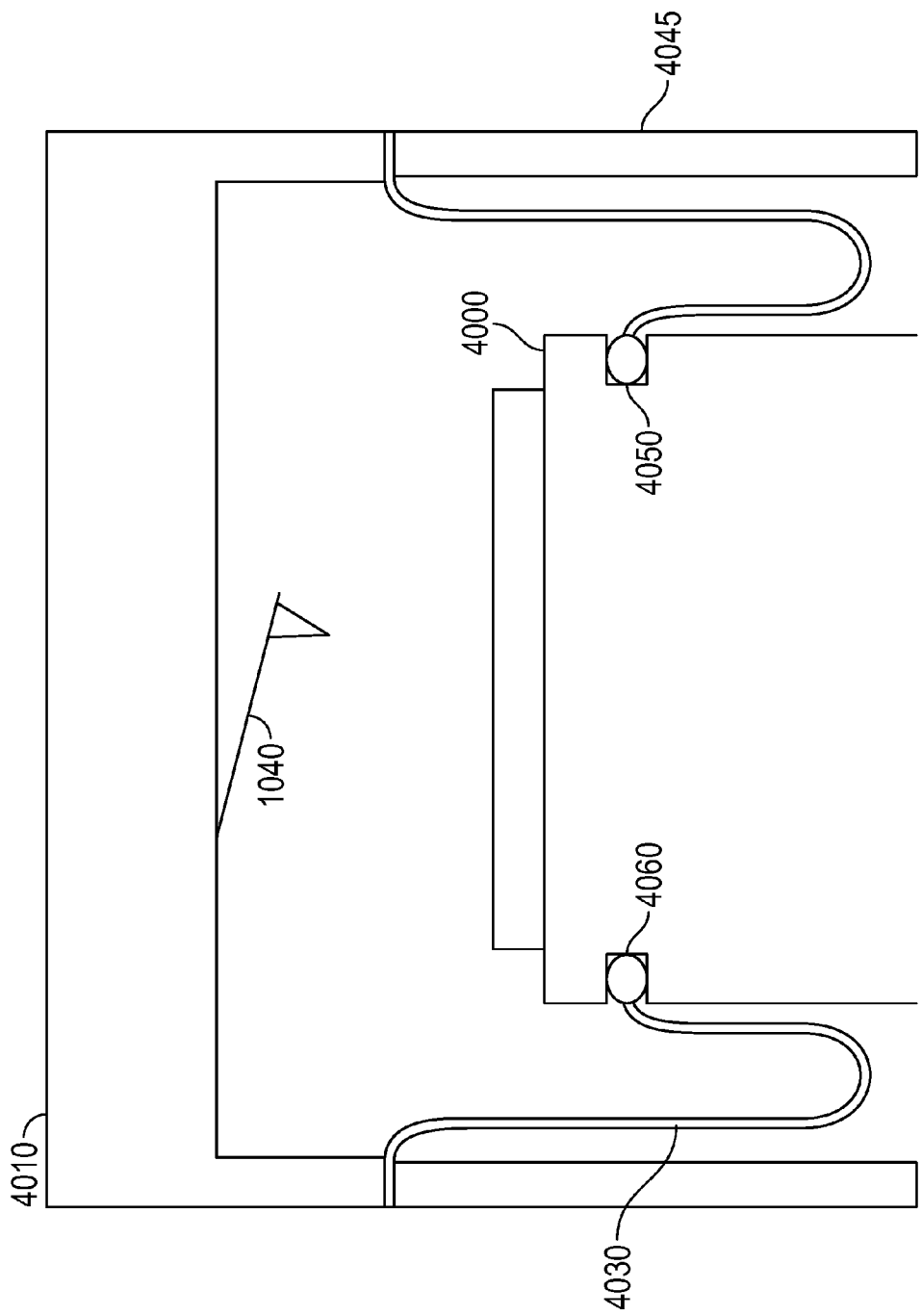
FIG. 5: Block diagram showing a sealed cell using a rolling diaphragm with an extended clamp.

FIG. 5 is another alternate design of a sealed cell for isolating the probe and sample using the rolling diaphragm. This design includes an extended clamp 4045 that aids in constraining motion of the rolling diaphragm. This is especially useful when the cell has an over-pressure.

Figure 6:
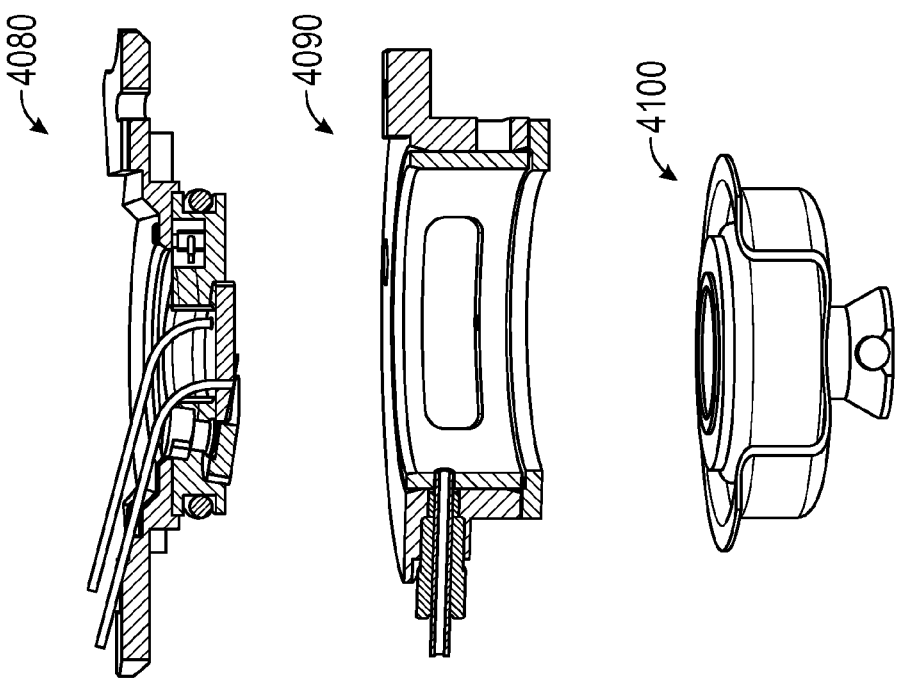
FIG. 6: Cross sectional view of a rendered model of a sealed cell, along with its constituent components: cantilever holder, cell body, and sample stage.
Figure 6:
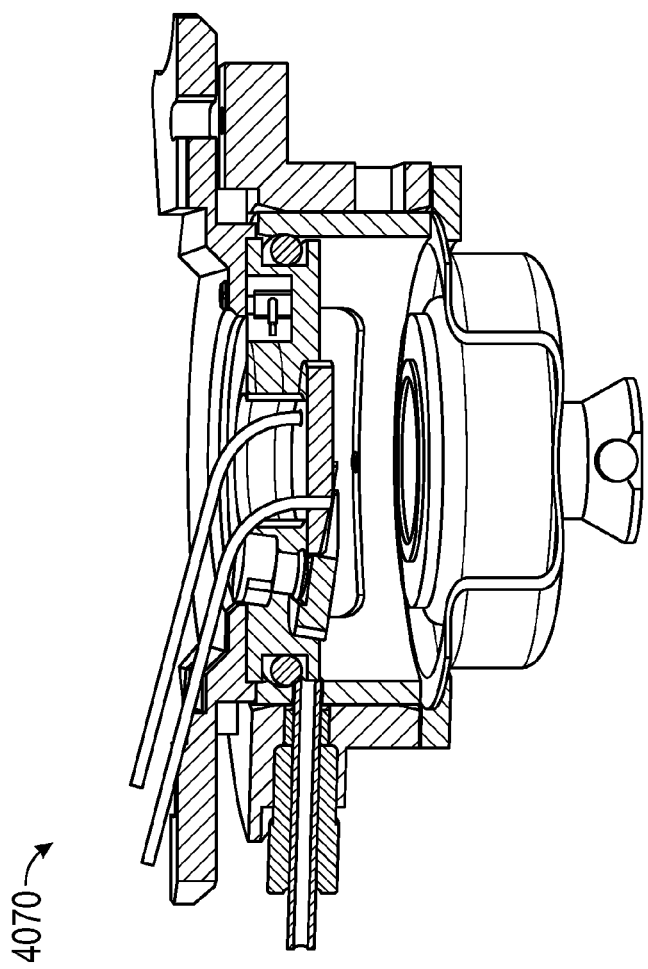

FIG. 6 shows a detailed rendering of a cross section of an apparatus for isolating the probe and sample of the present invention 4070, which incorporates the concepts of the apparatus shown in FIG. 3, together similarly detailed renderings of the major components of this apparatus, the cantilever holder 4080, cell body 4090, and sample stage 4100. The apparatus depicted is constructed with chemically inert materials, and for the most part materials able to withstand high temperatures without undergoing more than minimal thermal expansion. For the most demanding applications it is possible to construct the entire interior of the cell out of fused silica with a perfluoroelastomeric rolling diaphragm. The modular design of FIG. 6 has the advantage of allowing users to construct cells with different features optimized for their particular experiment.

Figure 7:
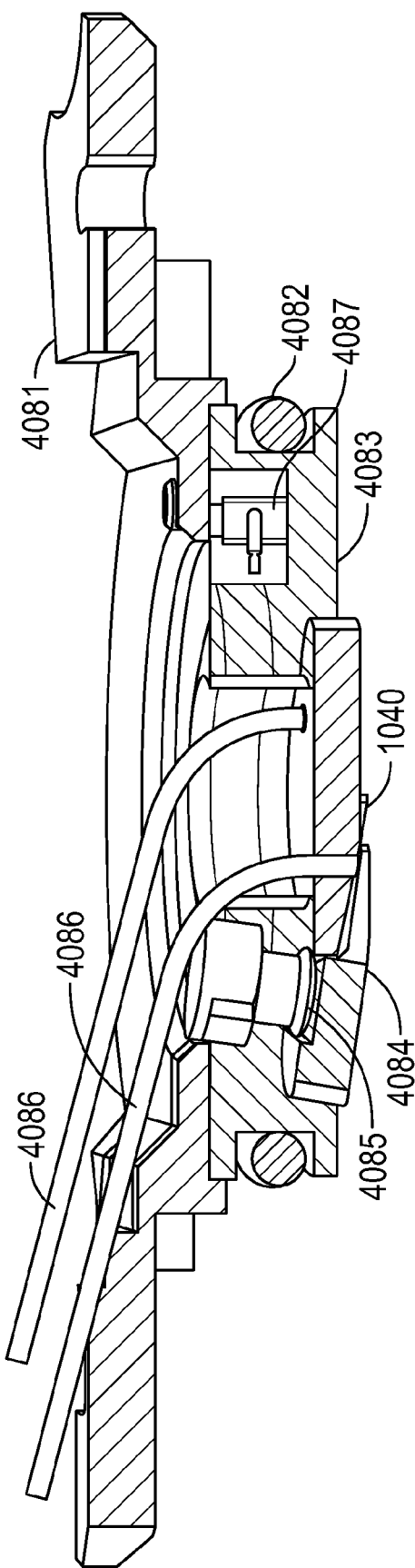
FIG. 7: Cross sectional view of cantilever holder of sealed cell.

FIG. 7 is an enlarged rendering of the cantilever holder identified as item 4080 in FIG. 6. The principal components of the cantilever holder of FIG. 7 are a support structure 4081, preferably made from INVAR or another material with a low coefficient of thermal expansion, and with a hollow cylindrical shape at the center to accommodate the window provided by the cantilever holder body 4083; a cantilever holder body 4083, preferably made from fused silica, or another chemically inert material with a low coefficient of thermal expansion, which has a transparent window at the center to allow optical detection of the cantilever 1040; an o-ring 4082 which forms the seal between the cell body, identified as item 4090 in FIG. 6, and the cantilever holder 4080; an actuator 4087 clamped between the support structure 4081 and the cantilever holder body 4083 to oscillate the cantilever; and a cantilever clip 4084 for clamping the cantilever 1040 in place, preferably made from PEEK, stainless steel or any other chemically inert material, which is sealed with o-ring 4085. In addition the cantilever holder 4080 provides two ports 4086 that permit liquids or gasses to be introduced into the chamber that is formed by the cantilever holder 4080, cell body 4090, and sample stage 4100

Figure 8:
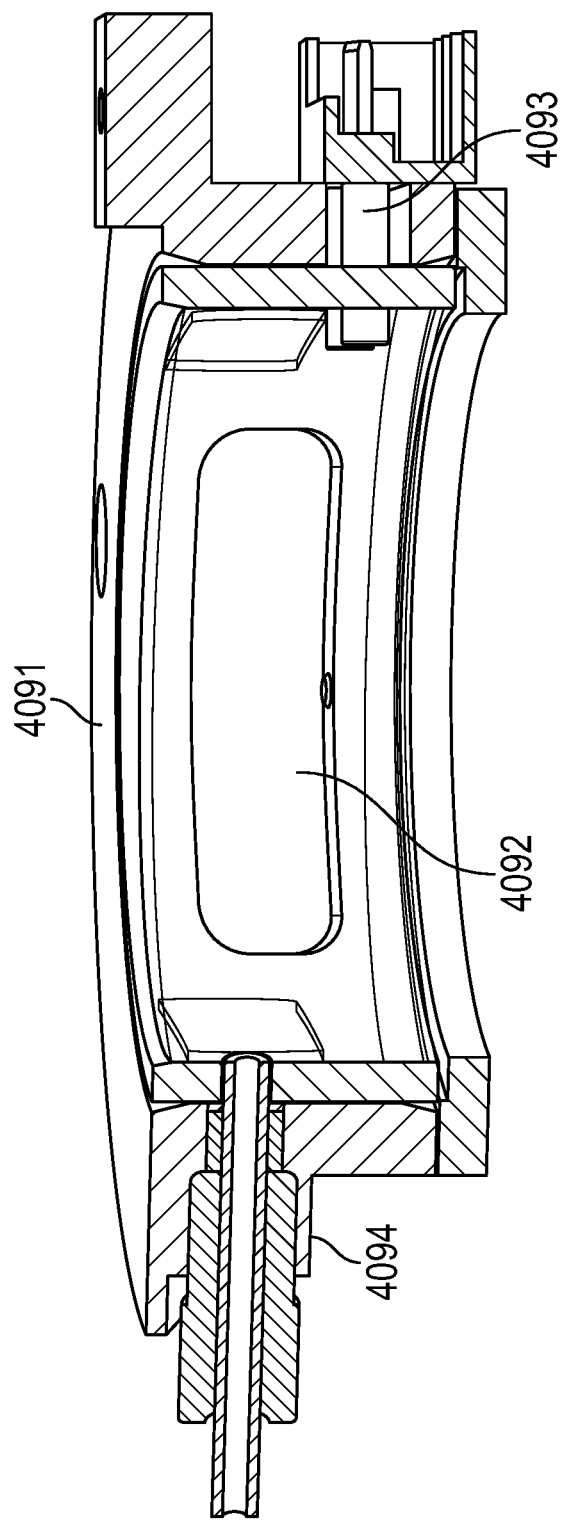
FIG. 8: Cross sectional view of cell body of sealed cell.

FIG. 8 is an enlarged rendering of the cell body identified as item 4090 in FIG. 6. The cell body is constructed of a rigid support 4091, preferably made from INVAR or another material with a low coefficient of thermal expansion and with a hollow cylindrical shape at the center. The inside of the hollow cylindrical shape is lined with a tube 4092 preferably made from fused silica. The tube 4092 could also be made from other materials, but fused silica has the advantage of being chemically inert and transparent, so that a window allowing the user to look into the chamber isolating the probe and sample that is formed by the the cantilever holder 4080, cell body 4090, and sample stage 4100. Optional electrical feed-throughs 4093 or gas or liquid ports 4094 may also be useful.

Figure 9:
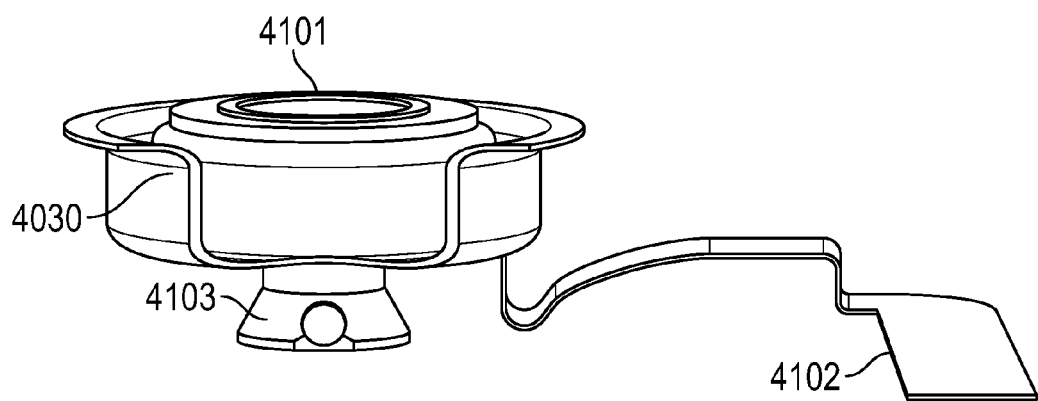
FIG. 9: Cross sectional view of sample stage of sealed cell.

FIG. 9 is an enlarged rendering of the sample stage identified as item 4100 in FIG. 6. The sample stage has a sample platter 4101, preferably made from chemically inert, low coefficient materials such as fused silica, that is bordered by a rolling diaphragm 4030, as discussed above in connection with FIG. 3. If the sample stage has integrated temperature control, a flex cable 4102, or other electrical connection is required. Lastly, an interface such as a dovetail 4103 allows the user to interchange different sample stages.

Figure 11:
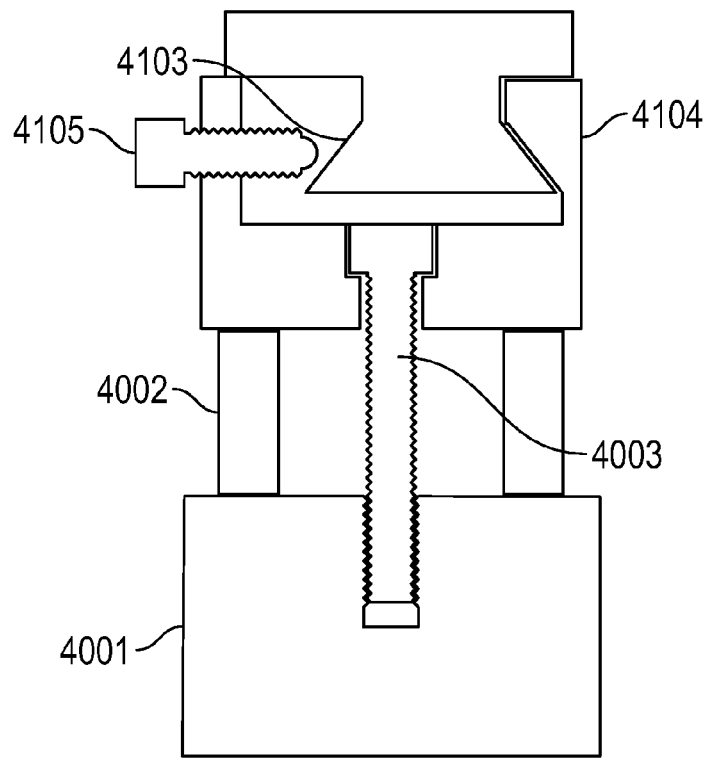
FIG. 11: A block diagram showing the integration of the dovetail to the z-actuator and X/Y actuator.

The dovetail 4103 is an important part of the design because, among other reasons, it allows one sample stage to be interchanged with another. In particular it allows the sample stage to be loaded top down into a receiving fixture mounted on the scanner 4000 as shown in FIG. 11, where the dovetail 4103 is being locked into place by a screw 4105 forming part of a receiving dovetail 4104. The receiving dovetail 4104 is attached firmly to the top of the scanner 4000.

The screw 4105 allows the sample stage 4100, to be loaded top down and, depending on the orientation of the receiving dovetail 4104 and screw 4105, locked into place from the front, back, or sides of the scanner 4000. Again depending on access, it may be possible to substitute one fully assembled cell 4070 for isolating the probe and sample of the present invention with another such cell. This is important for samples that need to be placed in the cell 4070 in a glove box or other non-ambient environment. In this case the cell 4070 will be fully assembled in the non-ambient environment, with the sample on the sample stage 4100, and then attached to the scanner 4000.

Of more fundamental importance, as the screw 4105 is turned to lock the dovetail 4103 in place, the dovetail experiences a downward force mating it firmly against the receiving dovetail 4104. This creates a high stiffness contact that is important for higher speed scanning. A low stiffness connection between the sample stage 4100 and scanner 4000 will cause unwanted resonances that will decrease the scanning bandwidth.

Figure 10:
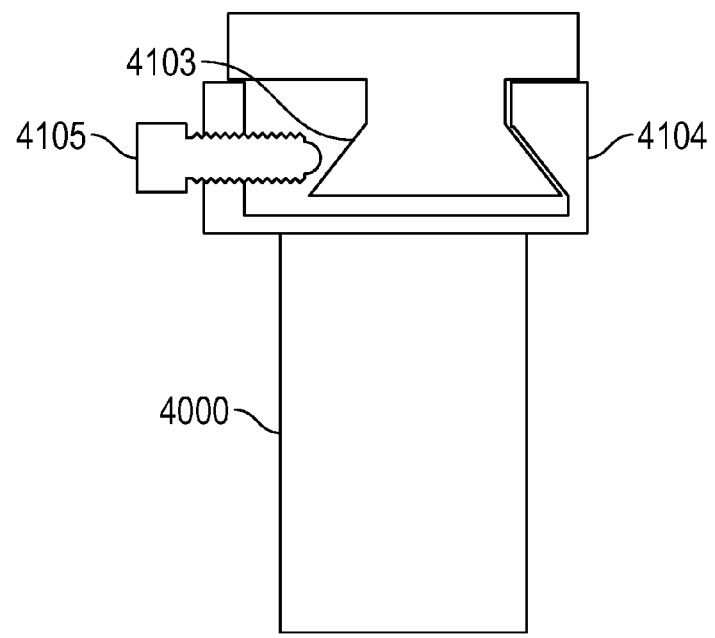
FIG. 10: A block diagram showing the dovetail mounting of sample stage.

Similarly, maintaining a high stiffness connection between the receiving dovetail 4104 and the scanner 4000 is important for maximizing the scan bandwidth and minimizing scan distortion. FIG. 11 deconstructs the scanner 4000 of FIG. 10 to show a screw 4003 binding the receiving dovetail 4104 to the scanner 4000 and also the component X/Y scanner 4001 and tubular Z-axis actuator 4002 within the scanner 4000 (not previously shown). Tightening the screw 4003 compresses and preloads the actuator, making a high stiffness connection between the receiving dovetail 4104 and the scanner 4000.

In this embodiment of the present invention motion along the z-axis happens because the force generated by the z-actuator 4002 is able to deform the screw 4003 or thread interface between the screw 4003 and X/Y scanner 4001. A tubular stack piezoelectric actuator that is 10 mm tall and has an inner and outer radius of 10/14 mm can generate a force of 1400 N. Depending on the dimensions and threading of the screw 4003 the z-axis actuator loses little or no range, even when the screw is fully tightened.

In this embodiment of the present invention, the screw 4003 itself and the thread interface between the X/Y scanner 4001 and the screw becomes a flexure. It is an extremely simple and inexpensive design and allows for easy assembly. More importantly however, it provides a method for preloading the Z-axis actuator without introducing a flexure that might allow rocking in the plane of the sample 1030. In this design the stiffness of the Z-axis actuator itself prevents the sample stage 4100 and hence the sample 1030 from rocking. This design also provides for a high stiffness connection between the sample stage 4100 and the X/Y scanner 4001. Stiffness in the X/Y plane is important for a variety of reasons, one of which is to avoid the application of small forces to the sample stage 4100 from the rolling diaphragm 4030 which would cause scan distortion. This embodiment minimizes those distortions because the stiffness of the Z-axis actuator itself prevents the receiving dovetail 4104 from rocking or moving in the X/Y plane.

As already noted, in addition to sealing the probe and sample in order to understand sample properties in a particular environment, similar isolation is necessary to maintain a temperature of interest where the user was seeking an understanding of sample properties at a particular temperature.

Figure 2:
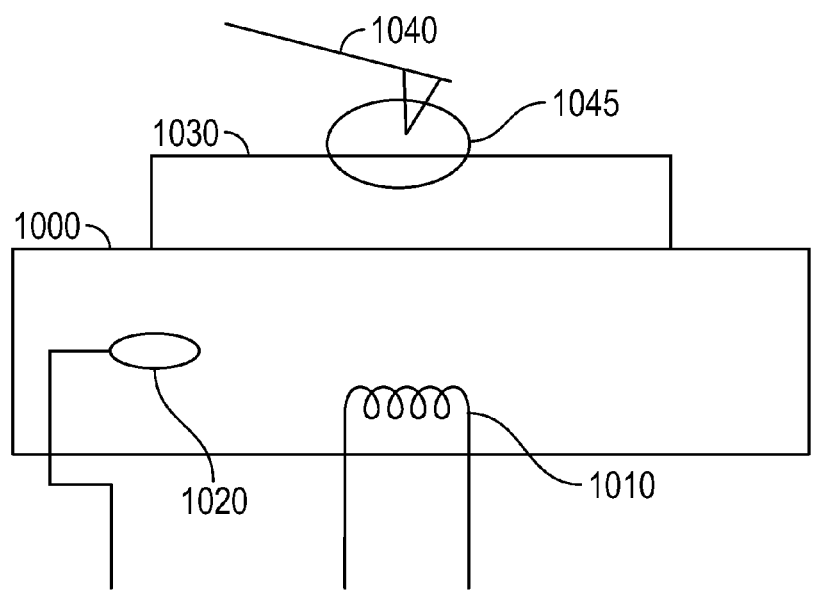
FIG. 2: Cross sectional view of probe and sample heating in prior art.

The prior art apparatus shown in FIG. 2 has the disadvantage that temperature gradients tend to make the temperature of the region of the sample being measured different from the temperature measured by temperature measuring means.

Figure 12:
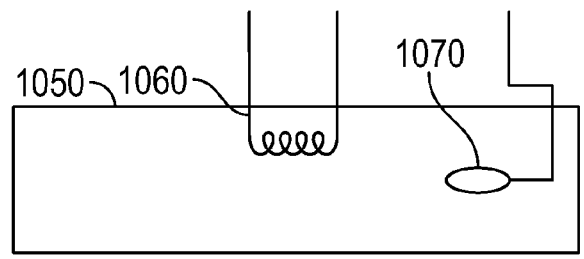
FIG. 12: Block diagram showing a method of sample heating with a heating block above the sample.
Figure 12:
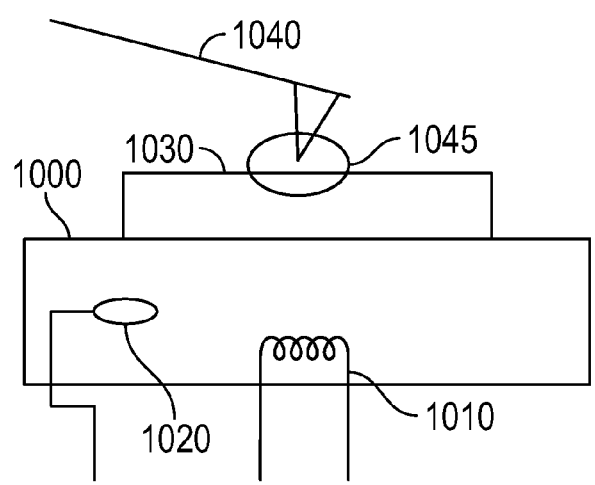

To avoid errors associated with temperature gradients, a plurality of heaters can be used, geometrically positioned to minimize temperature gradients in the sample region being probed. FIG. 12 shows such an apparatus. A heating element 1010 is included within or attached to the sample block 1000 as is a temperature measuring means 1020. The temperature measuring means 1020 is of course used to measure the temperature of the sample block 1000 and might also be used in a control circuit (not shown). The sample 1030 is mounted to the top surface of the sample block 1000 and the sample block is in turn mounted on a scanner (not shown). The probe 1040 is positioned above the sample and interacts with the sample. In addition a second block 1050, containing a second heater 1060 and a second temperature measuring means 1070 (which also might be used in a control circuit (not shown)), is positioned above the sample block 1000. By controlling the temperature of the second block 1050, it is possible to minimize the errors associated with temperature gradients at the region 1045 of the sample being measured by the probe 1040.

One important challenge posed by the apparatus of FIG. 12 is that the second block 1050 positioned above the sample block 1000 and the probe 1040 may interfere with the functioning of other components of the SPM/AFM. In particular having a block positioned above the probe 1040 may interfere with the optical lever arrangement whereby the amplitude, deflection, phase, frequency, etc. of the probe are detected by directing a light beam from above onto the side of the probe opposite the tip.

Figure 13:
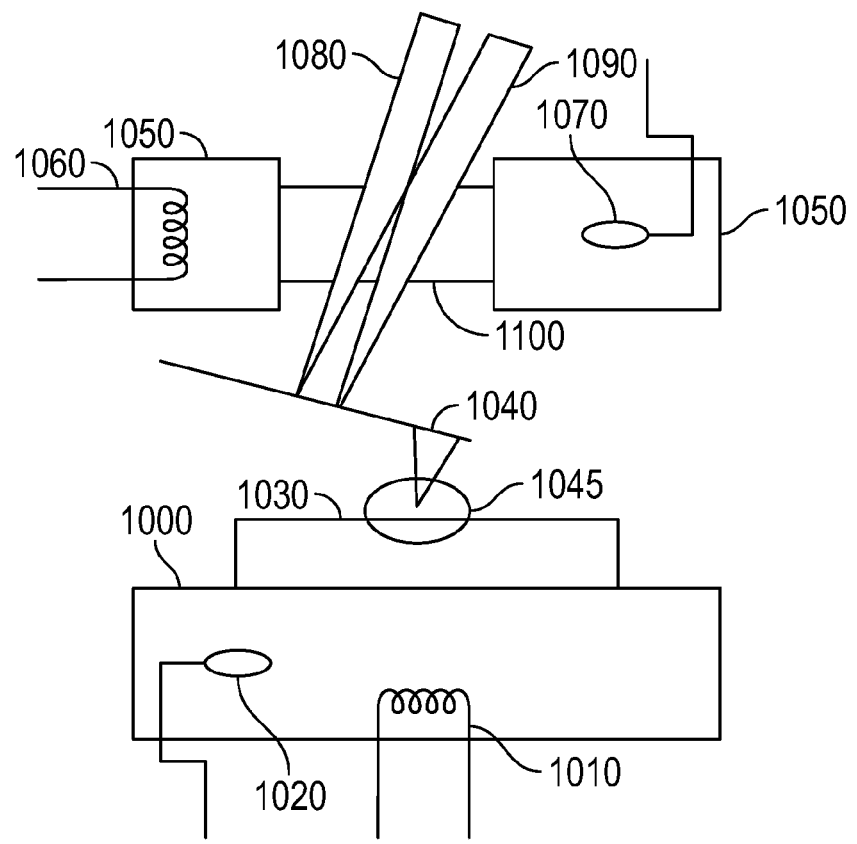
FIG. 13: Block diagram showing a method of sample heating method providing for an optical lever.

FIG. 13 alters the FIG. 12 apparatus to correct the challenge noted above. In the FIG. 13 apparatus a window 1100 is provided in the top block 1050 to allow the transmission of light through the block. The window 1100 allows an incoming (outgoing) beam 1080 and an outgoing (incoming) beam 1090 to be reflected off the back of the probe 1040 and to be used to measure the response of the tip as it interacts with the sample 1030. In one embodiment, the window is constructed of glass. In another, the window is a simple hole. In another, the entire top block 1050 is constructed of an optically transparent material so that the incoming (outgoing) beam 1080 and an outgoing (incoming) beam 1090 can be transmitted through an appropriate region of the block 1050.

Using a plurality of heaters to avoid errors associated with temperature gradients provides another advantage when a window 1100 in the top block 1050 of the FIG. 13 apparatus is used to avoid interfering with the optical lever arrangement. With this arrangement condensation on the various components show in FIG. 13 is minimized or eliminated. This can be especially useful for maintaining the window 1100 in the top block 1050 clear and able to transmit light.

An apparatus 4070 for isolating the probe and sample of the present invention may be modified to operate at high and low temperatures. The 4070 apparatus is depicted in cross sectional view in FIG. 6, together with its major components, the cantilever holder 4080, cell body 4090, and sample stage 4100. For the purposes of discussing the modifications necessary for operation at high and low temperatures it will be convenient to consult both FIG. 6, and particularly the sample stage 4100, and FIG. 11, which as already noted is a cross sectional line drawing of the sample stage 4100, together with the deconstructed scanner 4000 on which the sample stage 4100 is mounted.

Figure 14A:
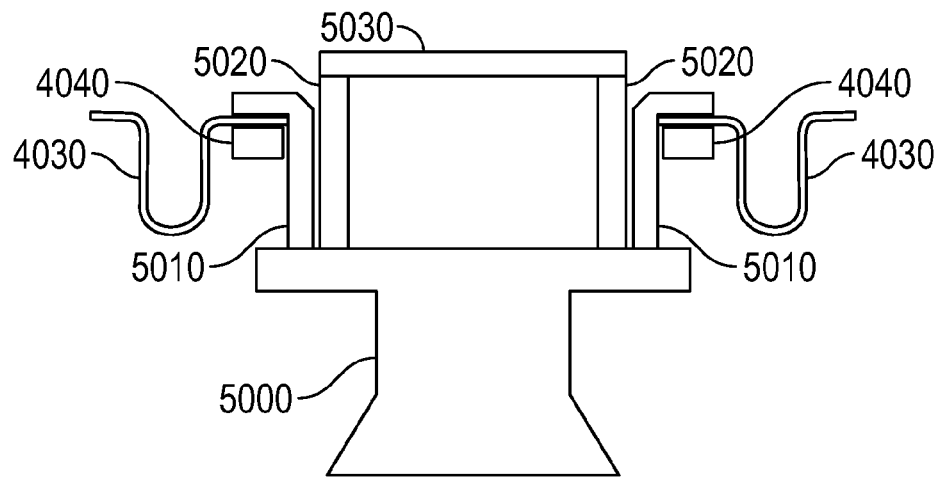
FIG. 14A,B,C: A block diagram showing different versions of sample stages providing for operation at high and low temperatures.

FIG. 14A shows the modifications of the present invention to the sample stage 4100 necessary for operation at high temperatures, as high as 1,000° C. The bottommost component 5000 of FIG. 14A corresponds to the dovetail, 4103 of FIG. 11 (which is also part 4103 of FIG. 9). The dovetail allows the sample stage 4100 to be loaded top down into a receiving fixture mounted on the scanner 4000 as shown in FIG. 11, where the dovetail 4103 is being locked into place by a screw 4105 forming part of a receiving dovetail 4104 mounted on the scanner 4000. In the case of dovetail 5000 it is preferable to use a material that has a low mass density, high mechanical strength, high stiffness, low coefficient of thermal expansion, and low coefficient of thermal conductivity. One such material is Invar.

Dovetail 5000 supports a cylinder 5020 of smaller diameter made of rigid material with a low coefficient of thermal expansion, a low coefficient of thermal conductivity and a high tolerance for high temperatures, preferably greater than 1,000° C. One such material is fused silica. Cylinder 5020 mechanically supports a heating element 5030, which also may serve as a sample support, preferably made of a material with a high coefficient of thermal conductivity, a low coefficient of thermal expansion and a high tolerance for high temperatures, preferably greater than 1,000° C. Diamond, silicon carbide, alumina or aluminum Nitride are preferred materials, or a more elaborate embodiment—patterning a resistive metal trace onto the bottom of a heating element made of a temperature tolerant material—may be preferable. It may be desirable to attach a temperature sensor, preferably a platinum resistance thermometer (not shown) to the heating element 5030. Finally high temperature tolerant wires (not shown) connect the heating element 5030 and temperature sensors (not shown), via a hole in the dovetail 5000 (not shown), to instrumentation electronics (not shown).

The dovetail 5000 also supports a second cylindrical structure 5010 positioned outside cylinder 5020 which in turn connects to the rolling diaphragm 4030. Since the typical elastomer material of which the diaphragm is made melts well below the maximum temperature of the heating element 5030, the cylindrical structure 5010 must be made of a low thermal conductivity material to thermally isolate the rolling diaphragm 4030. Preferably the cylindrical structure 5010 is made of fused silica or other low mass, low coefficient of thermal conductivity material.

Figure 14B:
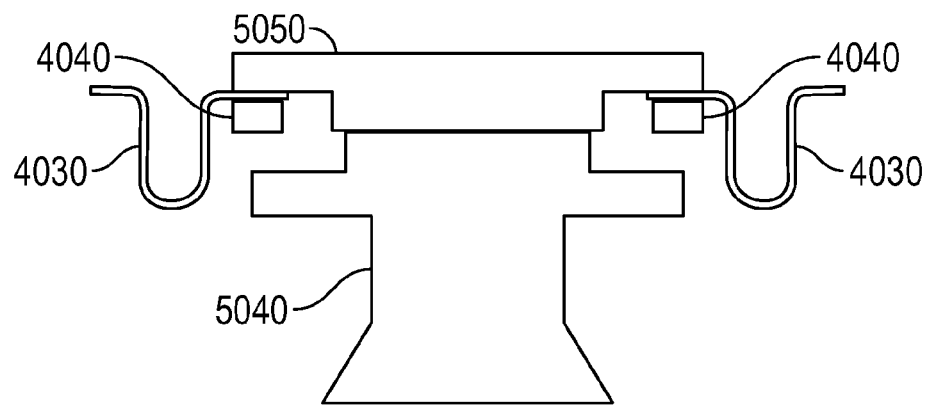

FIG. 14B shows the minor modifications to the sample stage 4100 necessary for operation at ambient temperature. Again the bottommost component 5040 of FIG. 14B corresponds to the dovetail, 4103 of FIG. 11 (which is also part 4103 of FIG. 9). In this case, the dovetail 5040 is preferably made of a material that has a low mass density, high mechanical strength, high stiffness, and low coefficient of thermal expansion. One possible choice is Invar. The thermal conductivity of the material is of lesser importance.

The plate 5050 which serves as a sample support is separate from the dovetail 5040. This allows for embedded magnets between the two parts, which is useful for holding samples in a preferred position on the plate. The plate 5050 preferably has low coefficient of thermal expansion, good mechanical strength and stiffness and a high degree of chemical inertness. One possible choice is fused silica.

Figure 14C:
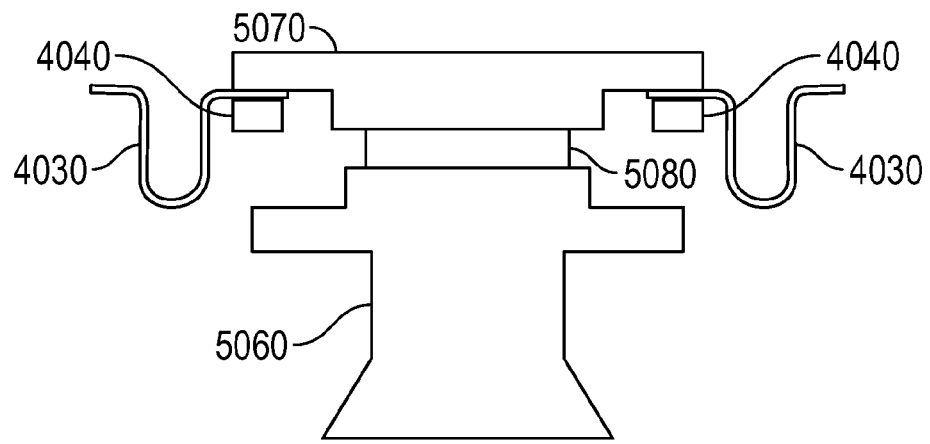

FIG. 14C shows the modifications of the present invention to the sample stage 4100 necessary for operating either below or above room temperature by means of a thermoelectric cooling element 5080. Such an element can move heat from one place to another through the action of an electrical current. This is known as the Peltier effect, and is reversible depending on the current direction though the TEC element 5080. The TEC element is a useful means for cooling or heating a sample 5080 with a single device.

As shown in FIG. 14C the TEC element 5080 is supported by dovetail 5060, which is preferably made of a material with a low coefficient of thermal expansion, a high coefficient of thermal conductivity, a low mass density and good mechanical strength and stiffness. Preferred materials are diamond, aluminum nitride, silicon carbide and copper. The high coefficient of thermal conductivity is particularly directed to operation of the TEC element 5080 in cooling mode. In this case a significant amount of waste heat is produced at the bottom of the TEC element 5080 and the dovetail 5060 must conduct this heat away to keep the TEC element 5080 cool.

The TEC element 5080 directly supports a sample support 5070 which supports a sample (not shown). The sample support 5070 is preferably made of material with a low coefficient of thermal expansion, a high coefficient of thermal conductivity, good high mechanical strength and stiffness and good chemical resistance. Preferred materials are silicon carbide, alumina, aluminum nitride, diamond, silicon, fused silica and stainless steel. It may also useful to attach or embed a temperature sensor (not shown) in the sample support 5070. The temperature sensor would be used for temperature feedback control of part 5070 and the sample that it supports. The rolling diaphragm 4030 may be attached directly to part 5070 since the typical TEC element cannot operate above the limit where the rolling diaphragm 4030 will melt.

Figure 15:
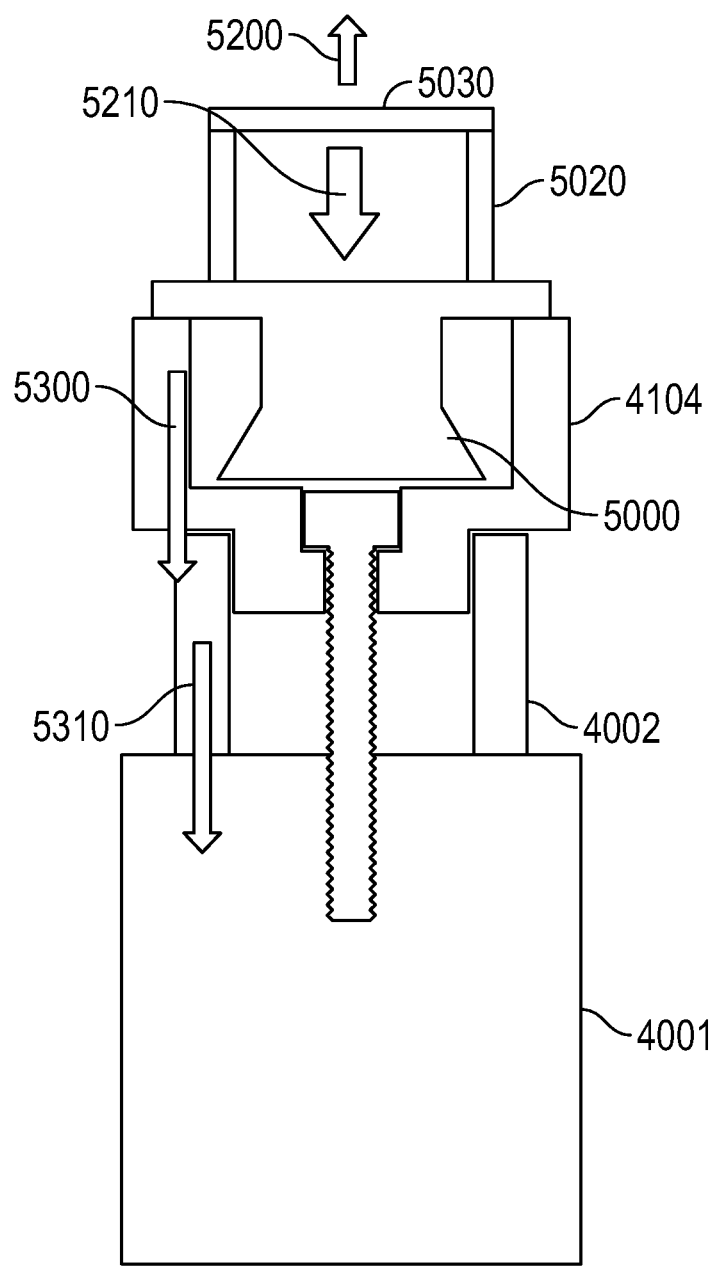
FIG. 15: A block diagram showing the heat flow from high temperature heating unit.

When electrical energy is converted to heat, that heat causes the local temperature to rise and eventually the elevated temperature will cause the heat to flow to adjacent materials which are at a lower temperature. FIG. 15 depicts the flow of heat away from the high temperature heating element 5030 of FIG. 14A. Some heat arrow 5200 will flow into the surrounding air. Since air conducts heat poorly, more heat will flow down through the mechanical structure supporting the high temperature heating element 5030. Arrow 5210 shows heat flowing from the high temperature heating element 5030 to the dovetail 5000, which will cause a rise in its temperature. Arrow 5300 shows heat flowing in turn from the dovetail 5000 to the receiving dovetail 4104 and then to to the tubular Z-axis actuator 4002 within the scanner 4000 (not shown) and finally to the X/Y scanner 4001 also within the scanner 4000 (again not shown). All these components will rise in temperature as the heat continues to flow from the high temperature heating element 5030.

Figure 16:
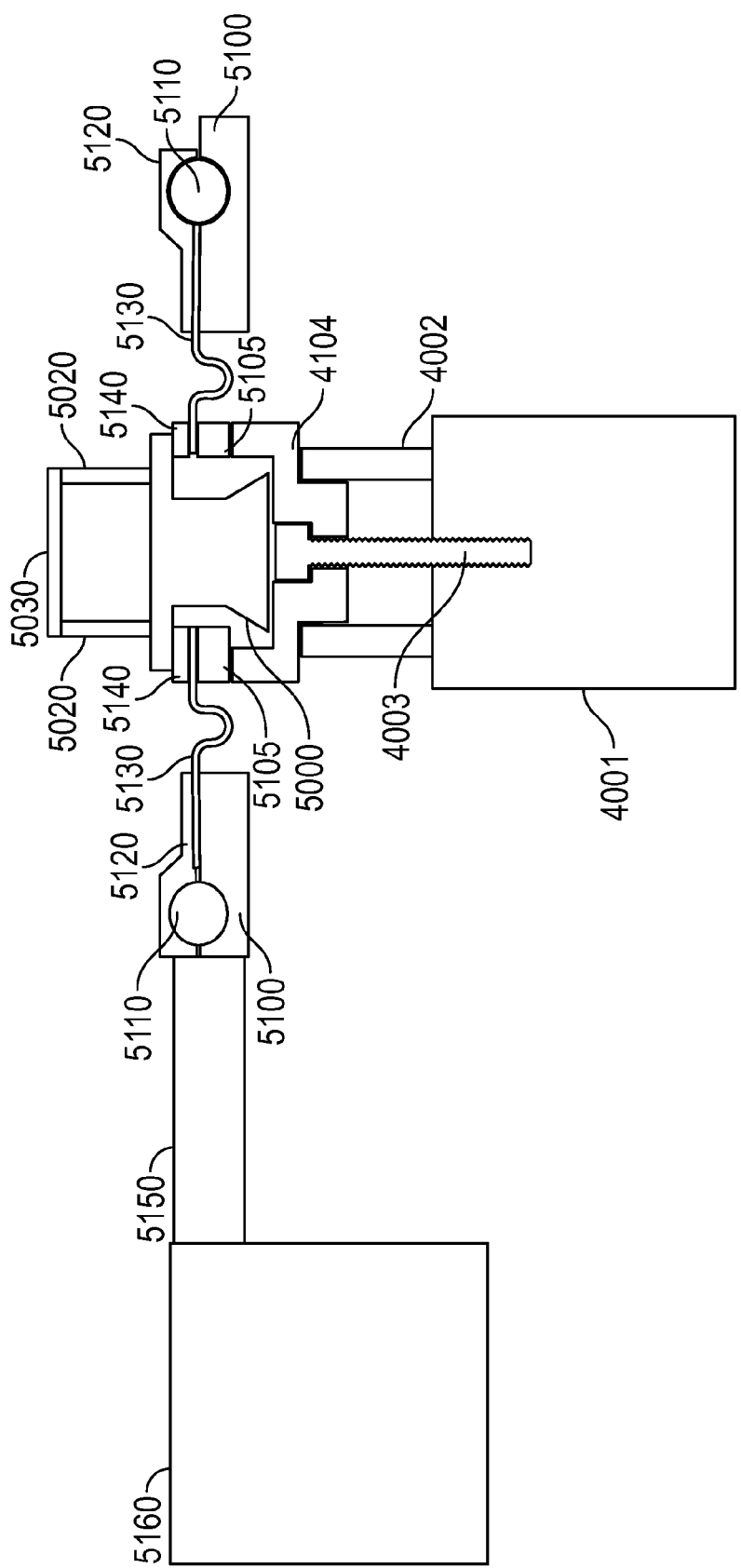
FIG. 16: A block diagram showing passive heat dissipation design.

FIG. 16 shows the present invention's passive method for the extraction of unwanted heat flowing from the heating element 5030. This method is based on the idea that heat which would otherwise flow on a path which it is desirable to avoid can dissipated relatively harmlessly by presenting the heat source with a second path with a much lower thermal resistance than the first path.

In FIG. 16 the dovetail 5000 is supported above the receiving dovetail 4104 by three circular structures: a first ring 5105 sitting on the receiving dovetail 4104 and preferably made from a material with a low coefficient of thermal conductivity, such as fused silica; a thin flexible second ring 5130 supported by the first ring 5105 which has a high coefficient of thermal conductivity, preferably higher than 400 W/mK; and a third ring 5140 supported by the second ring and directly supporting the dovetail 5000, which is made of a mechanically strong and rigid material with a high coefficient of thermal conductivity, preferably copper.

The outer perimeter of the thin flexible second ring 5130 ends with vapor filled heat pipe 5110 and the perimeter of the ring 5130 and the heat pipe 5110 are clamped between two copper annuli 5100 and 5120. The copper annuli 5100 and 5120 in turn are connected to a large thermally conductive mass 5160, preferably made of aluminum or copper and preferably cooled actively or passively by air or fluid flow, by means of a vapor filled heat pipe or another means 5150 having a high coefficient of thermal conductivity, preferably copper.

Figure 17:
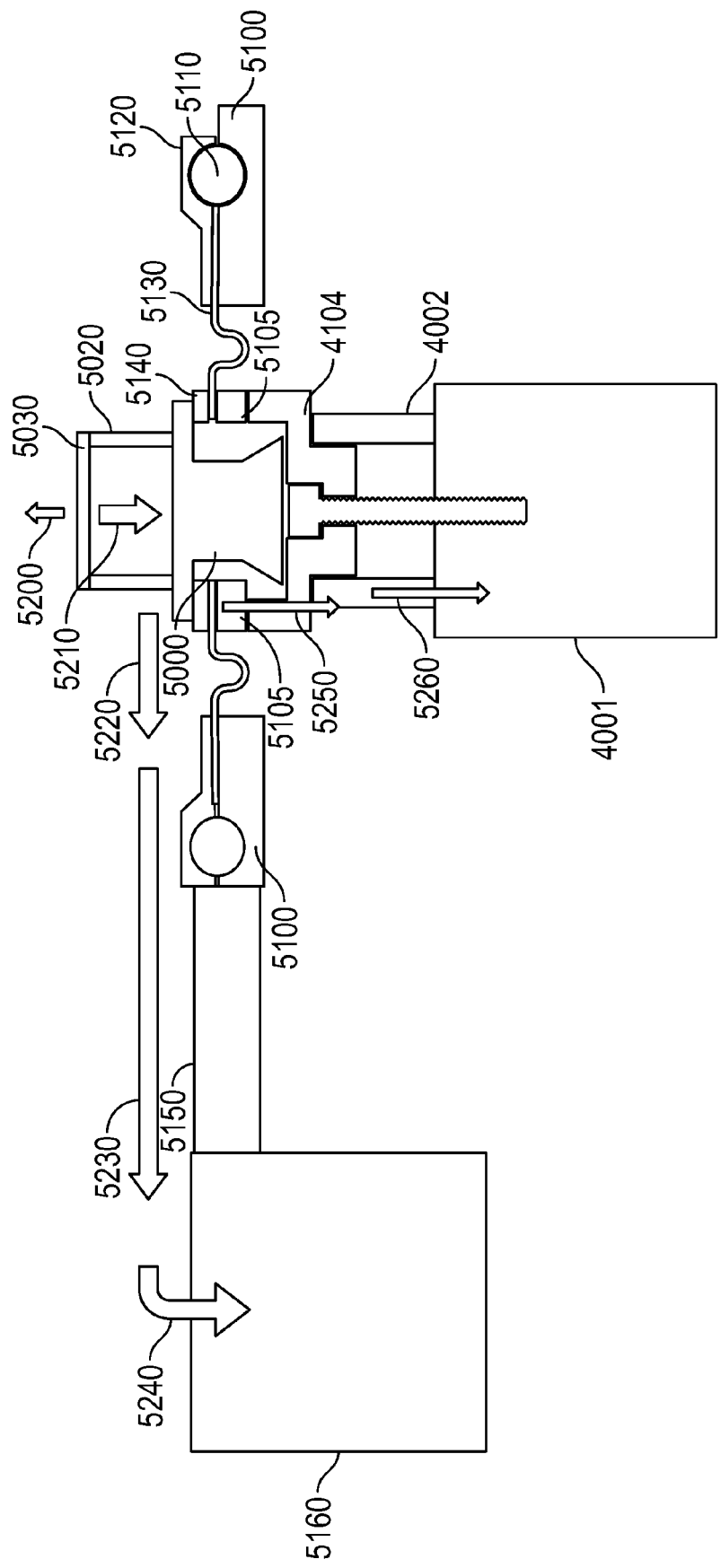
FIG. 17: A block diagram showing heat flow from high temperature heating unit using passive heat dissipation design.

The flow of heat through the FIG. 16 construction is shown in FIG. 17. The arrows in FIG. 17 show the flow of heat away from heating element 5030. As already noted, since air conducts heat poorly, only a small portion of the heat will flow into the air above heating element 5030 arrow 5200. Most of the heat will flow down through the low coefficient of thermal conductivity cylinder 5020 arrow 5210 and from there to dovetail 5100. At this point, the heat flow splits into a path of high thermal resistance arrow 5250 and a path of low thermal resistance arrow 5220. Most of the heat (arrow 5210 to arrow 5220 to arrow 5230 to arrow 5240) will flow to part 5160, away from the critical components of the instrument. Relatively little heat flows downward (arrow 5210 to arrow 5250 to arrow 5260) into the critical parts of the SPM/AFM.

Figure 18:
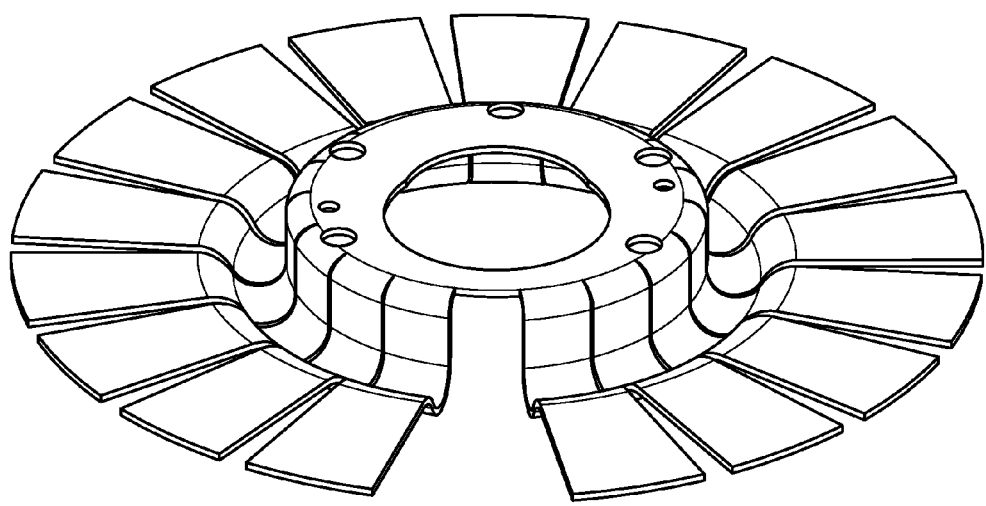
FIG. 18: Photographs of paper flexures, which illustrate how thin sheets of HOPG materials can be used to passively extract heat without distorting scanning.

The thin flexible second ring 5130 supporting the dovetail 5000 has as noted a high coefficient of thermal conductivity. Furthermore it is preferably made of a material as flexible as the rolling diaphragm 4030 described earlier. However, materials with a high coefficient of thermal conductivity (for example copper and diamond) are much more rigid than the materials used to make the rolling diaphragm 4030. Accordingly in order to provide a material suitable for the thin flexible second ring 5130 it was necessary to construct a proto-ring from thermally conductive materials that are rigid, but can be formed into thin flexible sheets. FIG. 18 is a drawing of an arrangement of highly ordered pyrolytic graphite (commonly referred to as "HOPG") strips bridging an inner disc and an outer annulus. HOPG meets the preferred requirement of a high coefficient of thermal conductivity. It has a coefficient of thermal conductivity greater than 300 W/mK. The inner disc of an arrangement of HOPG strips like that shown in FIG. 18 can easily tip, tilt, and move laterally in three dimensions. A stack of multiple thin strips of HOPG is preferred over a single layer of thicker strips. In many cases, it is preferable to make these thin sheets less than 100 um, 75 um, or even as thin as 25 um or less.

In addition, it may be useful to layer the materials, interspersing materials with different thermal and mechanical properties. In one embodiment, we have used a thin sheet of metal alloy that provides a relatively tough armor, protecting the thermally conductive material from damage, either from manufacturing or normal use.

It is well known that the elastic properties of materials, in particular materials that are used to construct probes are temperature dependent. In addition, thermoelastic coupling, intrinsic damping due to defect motion and generation cause non-trivial temperature dependent variations in the dissipation and therefore Q-factor of the probe. This all combines to make probe properties such as the spring constant and quality factor temperature dependent. Furthermore when we add the effects of possible condensation from the sample or elements of the AFM, the properties of a probe may vary significantly as the temperature changes.

Given that the mechanical properties of the probe are temperature dependent, there are a number of solutions that allow these changes to be taken into account for the purposes of optimizing SPM/AFM measurements. In particular, the probe can be tuned between measurements and the drive parameters adjusted to reflect changes in the response of the probe flowing from changes in temperature and other factors. If a particular free-air amplitude and relationship to the probe resonance frequency is required, the drive amplitude and frequency of the probe actuation can be adjusted after the tune is made to reset the probe. Other methods can be used to estimate the probe spring constant (see for example J. E. Sader et al. Rev. of ScientificC Ins. 83, 103705 (2012)). This spring constant can then be used in conjunction with thermal noise measurements to yield the optical lever sensitivity of the probe and other properties that allow quantification of the measurements as in the commercially available GetReal™ product offered by the assignee of this patent.

Some users, U.S. Pat. Nos. 6,389,886 and 6,185,992, have taken this correlation of temperature and probe mechanical properties relationship to mean that temperature in one component of the AFM apparatus should be adjusted to maintain one or more of these properties at a preset value. This approach very likely guarantees that the probe is being driven, for example, off resonance and in any event in a sub-optimal manner. For example, if the temperature changes in the SPM/AFM, the chip of the probe or the cantilever holder may be distorted due to the expansion of the material from which they are fabricated. This distortion may be in competition with the temperature dependence of the probe. If we take the approach of adjusting the temperature of the top plate, the resulting bending of the probe will be non-zero, leading to errors.

These effects also imply that the cantilever will be immersed in a substantial temperature gradient since in general, the two heated components of the SPM/AFM are at different temperatures. Temperature gradients are undesirable for AFM measurements for a number of reasons. One is that the actual temperature of the sample surface is ill-defined. The approach we take is substantially different.

First, by substantially eliminating temperature gradients, we improve the thermometry of the sample. We also measure the operating parameters of the SPM/AFM as a function of the mechanical properties of the probe. Then when there is a change in temperature we first allow the probe to respond to that change and after it has we adjust the operating parameters to respond to the change so that the probe is still operating at its natural resonant frequency or at a preset relationship near the resonant frequency. Putting it another way, we accept the fact that temperature effects will change the behavior of the cantilever probe and it is therefore necessary to adjust the operating parameters of the microscope to respond to what is in effect a "new" cantilever with new mechanical properties. If, as is taught in the prior art, one instead changes the temperature of the top plate to force a cantilever parameter back to some preset value, there can be many disadvantages. First and in many cases foremost is the introduction of temperature gradients in the cell since there is usually a difference between the temperature of the top plate and the bottom plate. As an ancillary effect, this can also result in driving the cantilever off resonance since the resonant frequency may change in response to the temperature and temperature gradients required to keep the other parameter—the deflection—constant.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. An atomic force microscope system, comprising:
   an atomic force microscope cantilever, having a tip, said cantilever on a cantilever holder;
   a sample block, having a top surface adapted for a holding a sample to be measured by the atomic force microscope cantilever;
   a rolling diaphragm, formed of a flexible membrane material, said rolling diaphragm sealing between said sample block and said cantilever holder to form a sealed chamber between said sample block and said cantilever holder;
   a scanning mechanism, operable for moving the sample block while said rolling diaphragm maintaining said sealed chamber between said sample block and to said cantilever holder,
   wherein said rolling diaphragm allows at least 10 mm of movement between said sample block and said cantilever holder while maintaining said sealed chamber between said sample block and said cantilever holder;
   where the atomic force microscope cantilever is above the sample block;
   said sample block including a heater which heats the sample block, and including a temperature sensor that senses a temperature of the sample block;
   a second block, above the atomic force microscope cantilever, and above the sample block;
   the second block having a second heater and a second temperature sensor,
   a controller that controls temperatures of the sample block and the second block to avoid temperature gradients in a region of the sample.

2. The system as in claim 1, further comprising a detecting system that detects a position of the cantilever using an optical lever directed on to the cantilever.

3. The system as in claim 2, wherein the second block includes a window therein, and the optical lever is directed through the window to the cantilever, and a reflection from the cantilever is directed through the window.

4. The system of claim 3, wherein the window is constructed of an optically transparent material.

5. The system as in claim 2, wherein the second block is formed of an optically transparent material, and the optical lever is directed through the optically transparent material to the cantilever, and reflection from the cantilever is directed through the optically transparent material.

6. The system as in claim 1, wherein the sample block and the second block are controlled to the same temperature.

7. The system as in claim 1, further comprising the sample, whose characteristics are monitored by the cantilever.

8. A method of operating an atomic force microscope system, comprising:
   using an atomic force microscope cantilever, having a tip to monitor characteristics of a sample that is mounted on a top surface of a sample block;
   where the atomic force microscope cantilever is above the sample block;
   using a rolling diaphragm, formed of a flexible membrane material, for sealing between said sample block and said cantilever holder to form a sealed chamber between said sample block and said cantilever holder;
   using a scanning mechanism for moving the sample block while said rolling diaphragm maintaining said sample block sealed chamber between said sample block and to said cantilever holder,
   wherein said rolling diaphragm allows at least 10 mm of movement between said sample block and said cantilever holder while maintaining said sealed chamber between said sample block and said cantilever holder;
   using a heater for heating said sample block;
   using a temperature sensor for sensing a temperature of the sample block;
   locating a second block above the an atomic force microscope cantilever, and above the sample block;
   using a second heater for heating the second block;
   using a second temperature sensor for sensing a second temperature of the second block; and
   controlling temperatures of the sample block and the second block to avoid temperature gradients in a region of the sample.

9. The method as in claim 8, further comprising detecting a position of the cantilever using an optical lever directed on to the cantilever.

10. The method as in claim 9, wherein the second block includes a window therein, and further comprising directing a beam from the optical lever through the window to the cantilever, and a reflection from the cantilever through the window.

11. The method as in claim 10, wherein the window is constructed of an optically transparent material.

12. The method as in claim 9, wherein the second block is formed of an optically transparent material, and directing the optical lever through the optically transparent material to the cantilever, and directing a reflection from the cantilever through the optically transparent material.

13. The method as in claim 8, further comprising controlling the top plate and the bottom plate to the same temperature.

14. The method as in claim 8, further comprising adjusting to a change in temperature by first allowing the cantilever to respond to a new temperature, and after the cantilever has adjusted to the new temperature, adjusting operating parameters of the cantilever to operate the cantilever at its natural resonant frequency for the new temperature.

15. The method as in claim 8, further comprising adjusting to a change in temperature by first allowing the cantilever to respond to a new temperature, and after the cantilever has adjusted to the new temperature, adjusting operating parameters of the cantilever to operate the cantilever at a preset relationship near a resonant frequency for the new temperature.

\* \* \* \* \*